(12) United States Patent
Casanova et al.

(10) Patent No.: US 9,916,934 B1
(45) Date of Patent: Mar. 13, 2018

(54) MULTI-RATED CAPACITOR ASSEMBLY

(71) Applicant: Cornell Dubilier Electronics, Inc., New Bedford, MA (US)

(72) Inventors: Hector Arsenio Casanova, Tiverton, RI (US); Rui Miguel Batista, New Bedford, MA (US); Brian Lowell Padelford, New Bedford, MA (US); Paul Mathew Jan Jorissen, Jr., South Dartmouth, MA (US)

(73) Assignee: Cornell Dubilier Electronics, Inc., New Bedford, MA (US)

( * ) Notice: Subject to any disclaimer, the term of this patent is extended or adjusted under 35 U.S.C. 154(b) by 102 days.

(21) Appl. No.: 15/095,297

(22) Filed: Apr. 11, 2016

(51) Int. Cl.
| | |
|---|---|
| *H01G 4/32* | (2006.01) |
| *H01G 4/38* | (2006.01) |
| *H01G 4/14* | (2006.01) |
| *H01G 4/236* | (2006.01) |
| *H01G 4/005* | (2006.01) |
| *H01G 4/224* | (2006.01) |

(52) U.S. Cl.
CPC ............. *H01G 4/385* (2013.01); *H01G 4/005* (2013.01); *H01G 4/14* (2013.01); *H01G 4/224* (2013.01); *H01G 4/236* (2013.01); *H01G 4/32* (2013.01)

(58) Field of Classification Search
CPC ............ H01G 9/12; H01G 9/008; H01G 9/10; H01G 9/145; H01G 9/028; H01G 4/32; H01G 4/38
See application file for complete search history.

(56) References Cited

U.S. PATENT DOCUMENTS

| | | | |
|---|---|---|---|
| 4,106,068 A | 8/1978 | Flanagan | |
| 4,398,782 A | 8/1983 | Markarian | |
| 4,633,369 A | 12/1986 | Lapp et al. | |
| 6,819,545 B1 * | 11/2004 | Lobo | H01G 9/12 361/15 |
| 7,365,959 B1 | 4/2008 | Ward | |
| 7,848,079 B1 | 12/2010 | Gordin et al. | |
| 8,098,479 B1 | 1/2012 | Parler, Jr. et al. | |
| 8,531,815 B2 | 9/2013 | Stockman | |

(Continued)

OTHER PUBLICATIONS

Cornell Dublier Electronics, Inc., Industrial Power Factor Correction Capacitors, Flyer, pre-2010, p. 4, New Bedford, Massachusetts.

(Continued)

*Primary Examiner* — Nguyen Ha
(74) *Attorney, Agent, or Firm* — Timothy J. Monahan; Monahan & Company, LLC

(57) ABSTRACT

A capacitor assembly is provided having a case containing an upper capacitor and a lower capacitor in vertical alignment, each of the capacitor elements are separately sealed and provided with a pressure interrupter. A terminal board overlays the cover of the upper capacitor and is affixed to the top of the case. The terminals associated with the upper capacitor are mounted on the cover and extend through openings in the terminal board. The terminals associated with the lower capacitor are mounted on the terminal board and connected to contacts on the cover of the lower capacitor. The common leads of all of the capacitor elements are connected, thereby allowing any or all of the capacitor elements to be connected in parallel by accessing the terminals from the terminal board.

20 Claims, 8 Drawing Sheets

(56) References Cited

U.S. PATENT DOCUMENTS

| | | | | |
|---|---|---|---|---|
| 9,466,429 | B1* | 10/2016 | Casanova | H01G 11/82 |
| 2007/0253146 | A1* | 11/2007 | Inoue | H01G 2/04 |
| | | | | 361/328 |
| 2008/0158780 | A1* | 7/2008 | Stockman | H01G 9/008 |
| | | | | 361/520 |
| 2014/0126107 | A1* | 5/2014 | Yoda | H01G 4/38 |
| | | | | 361/303 |
| 2017/0186554 | A1* | 6/2017 | Stockman | H01G 9/12 |

OTHER PUBLICATIONS

Packard, Titan Flex Multi-Rated Capacitor, www.packardonline.com, pre-2015.

* cited by examiner

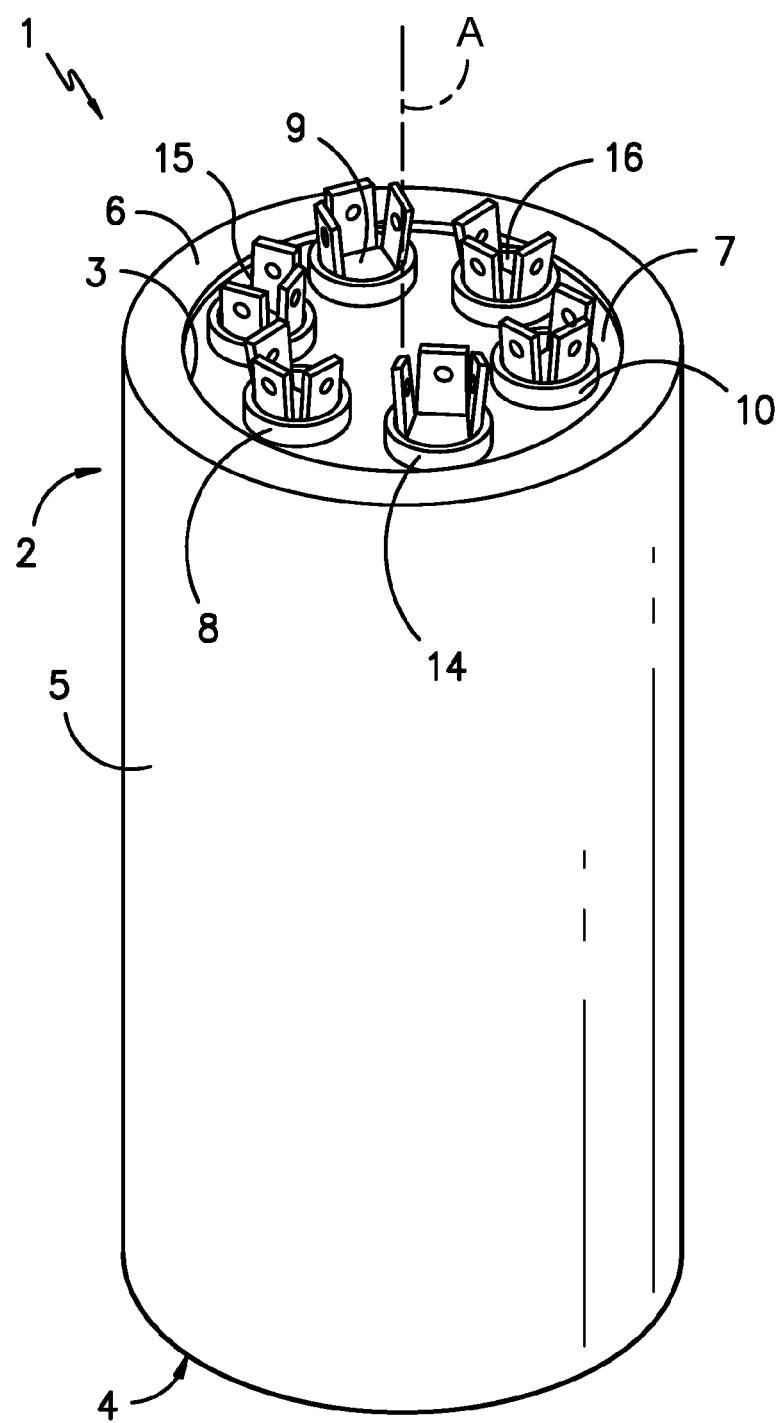
FIG. -1-

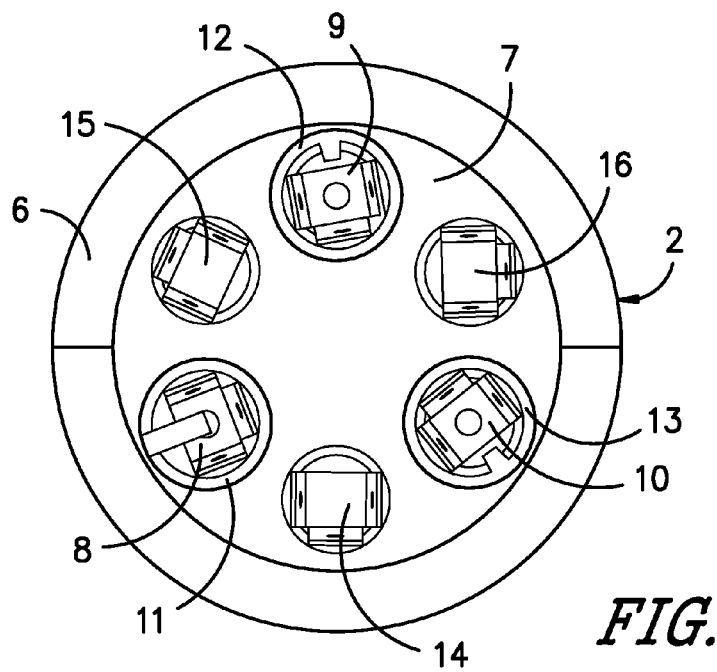
FIG. -2-
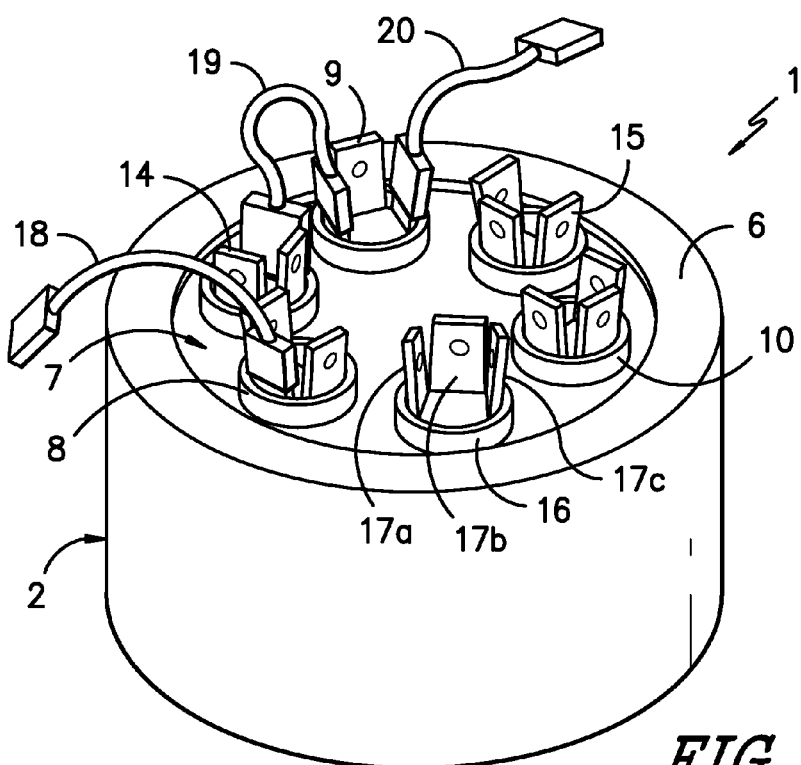
FIG. -3-

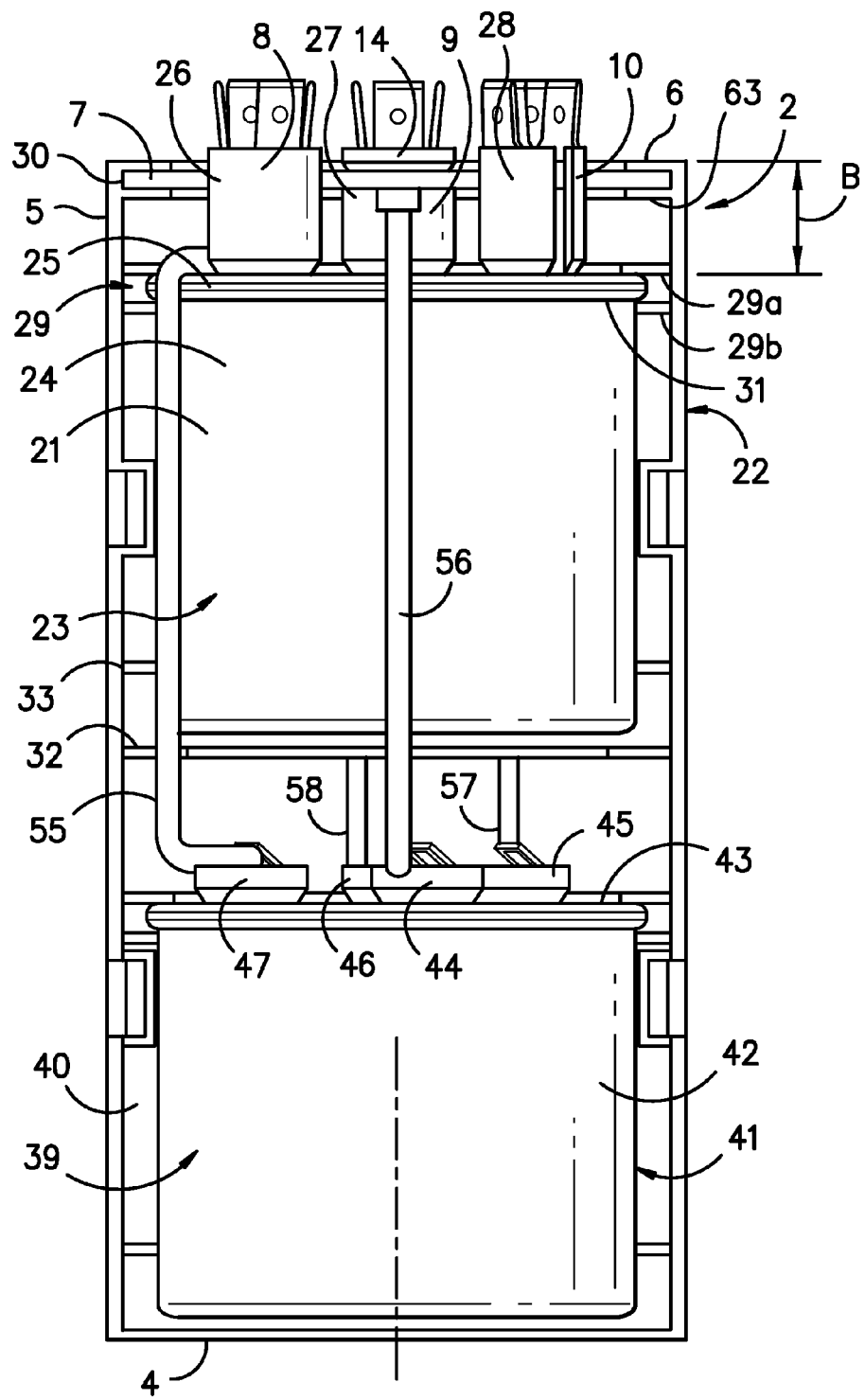
FIG. -4-

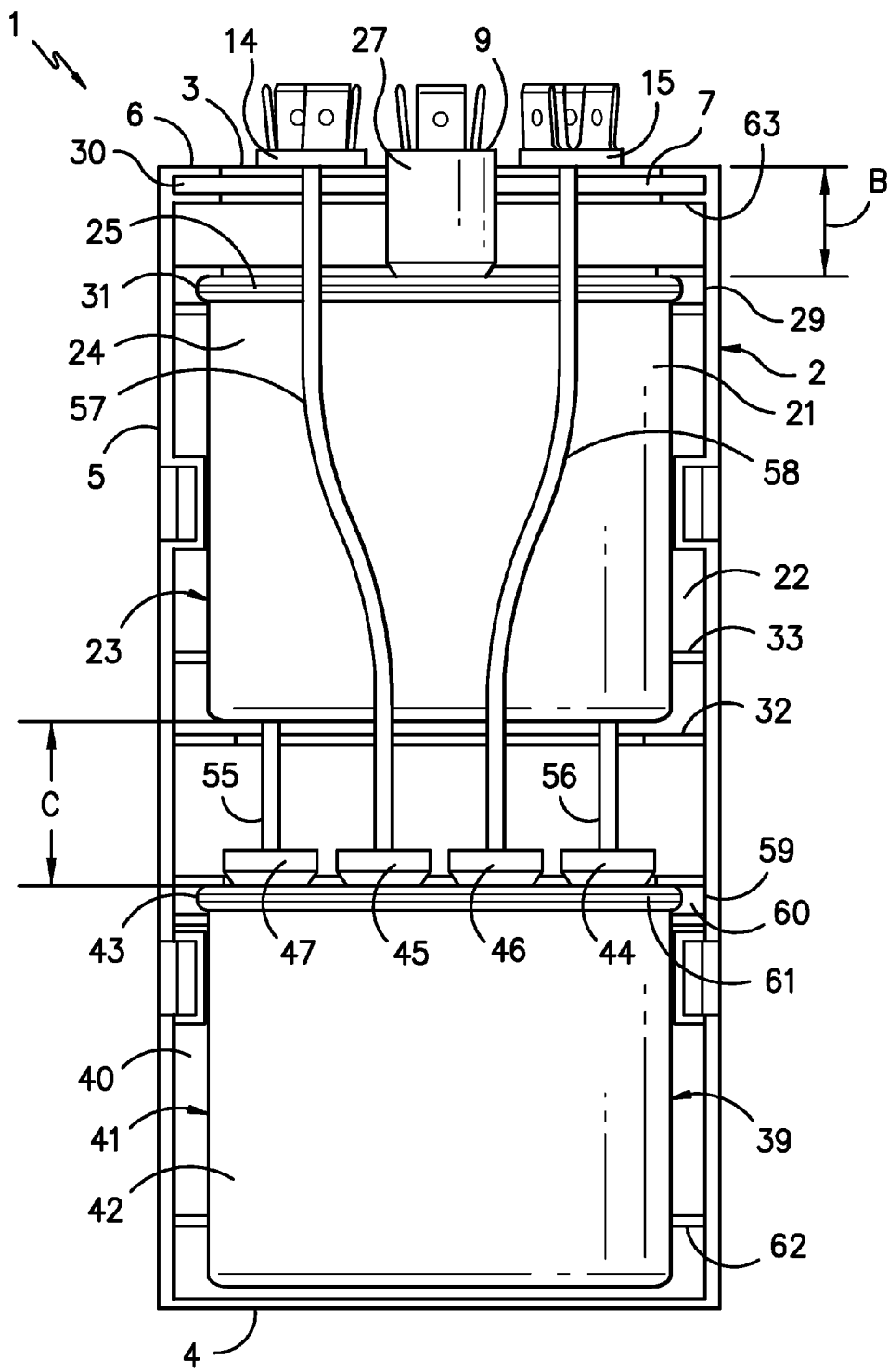
FIG. -5-

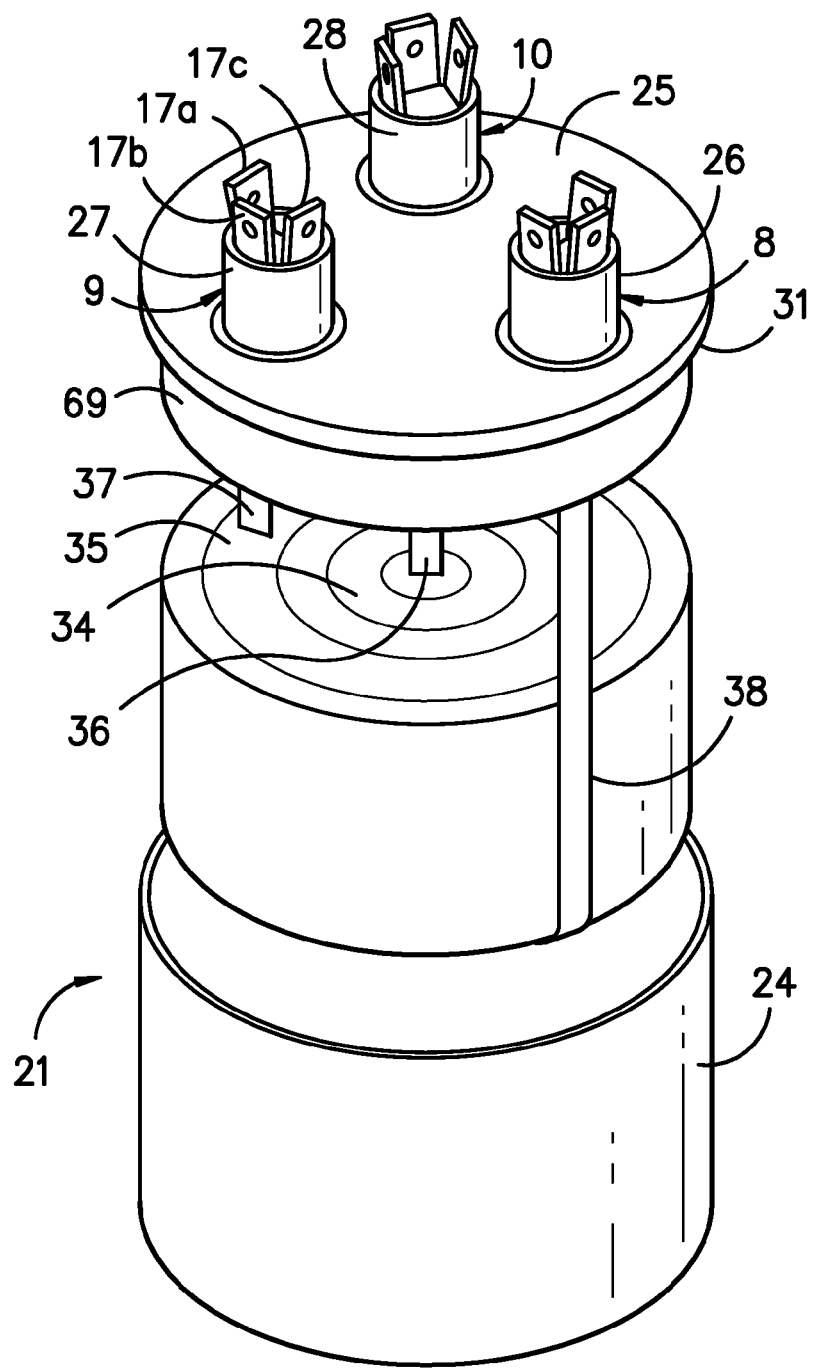
FIG. -6-

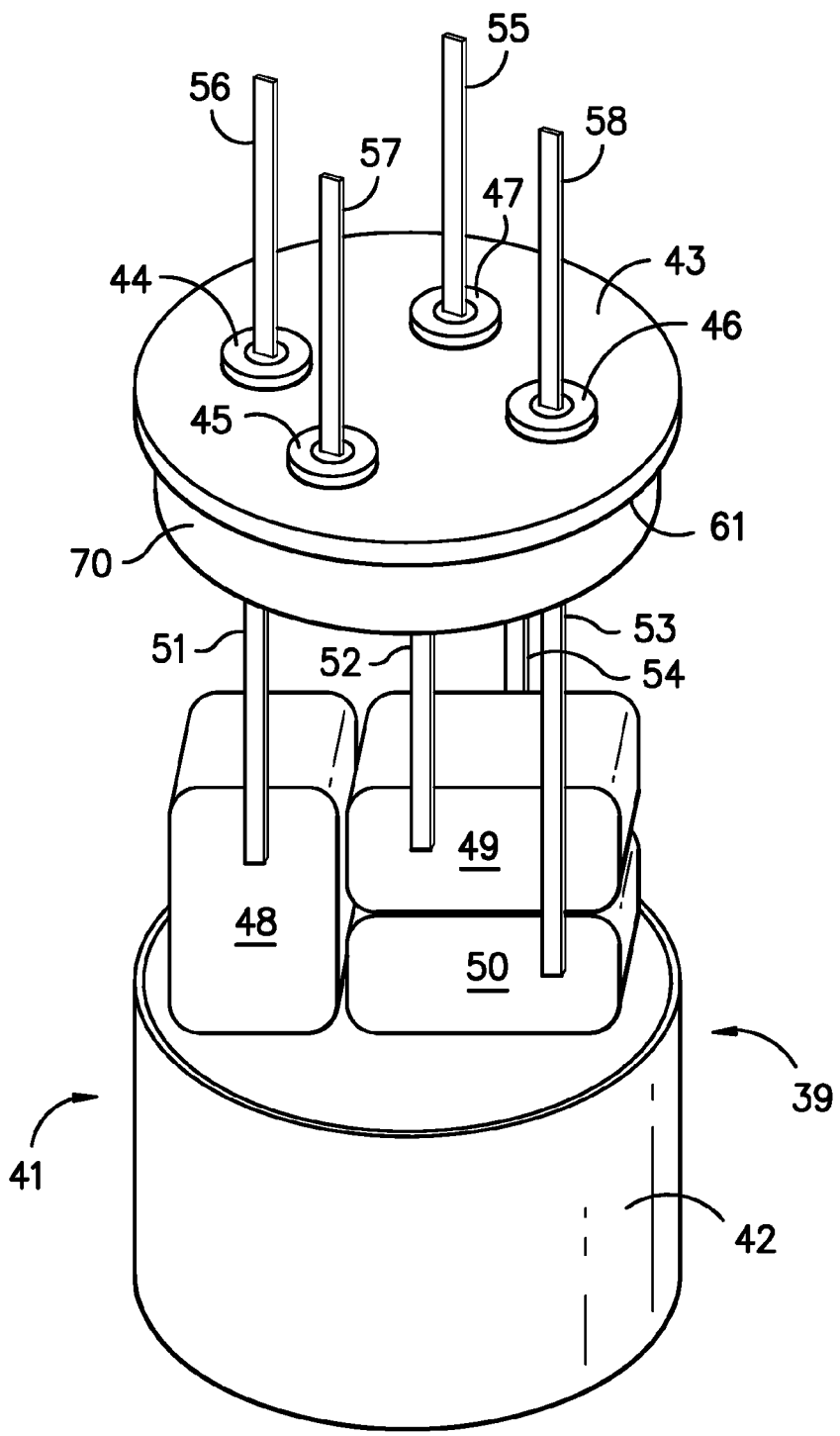
FIG. -7-

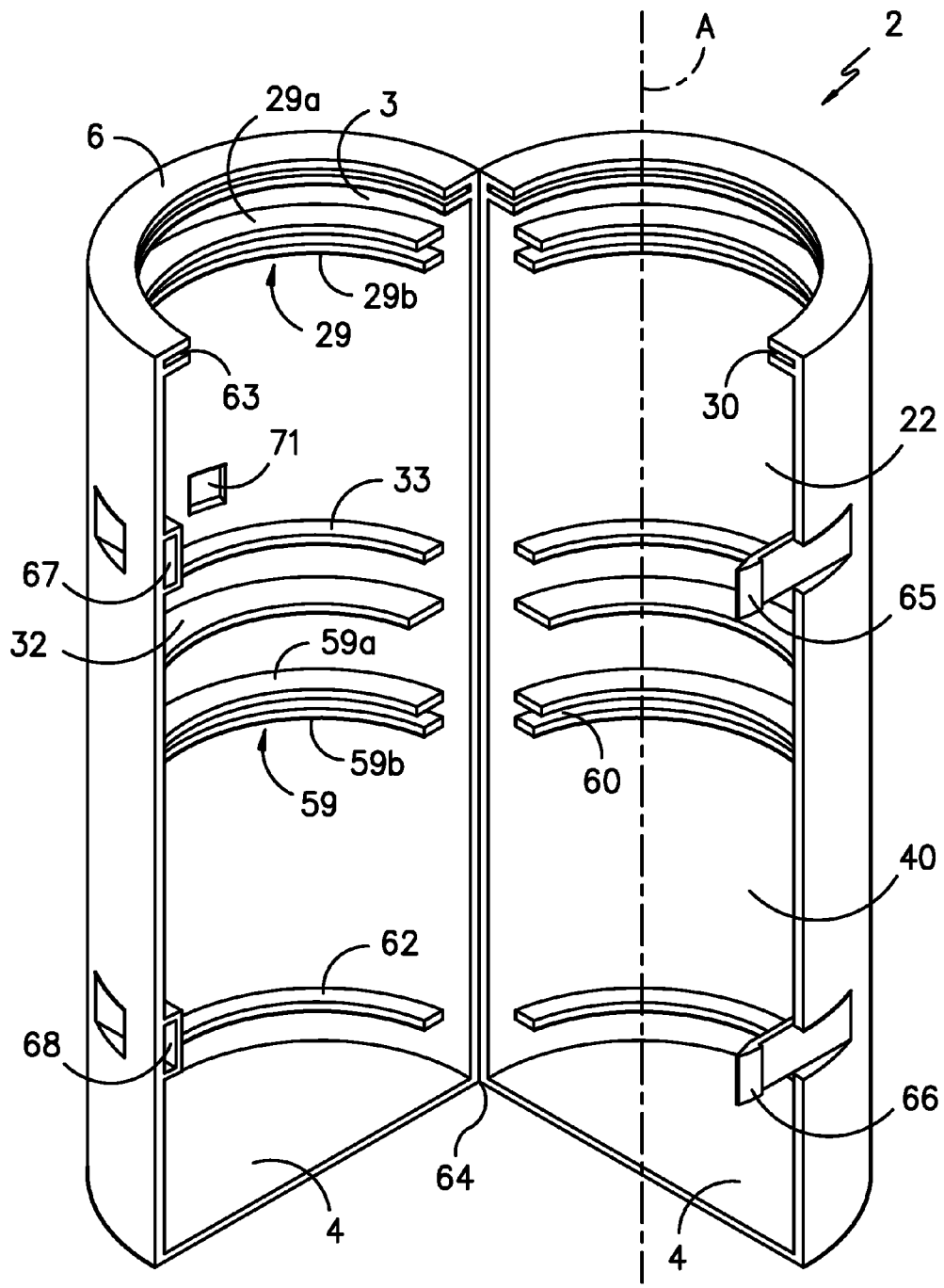
FIG. -8-

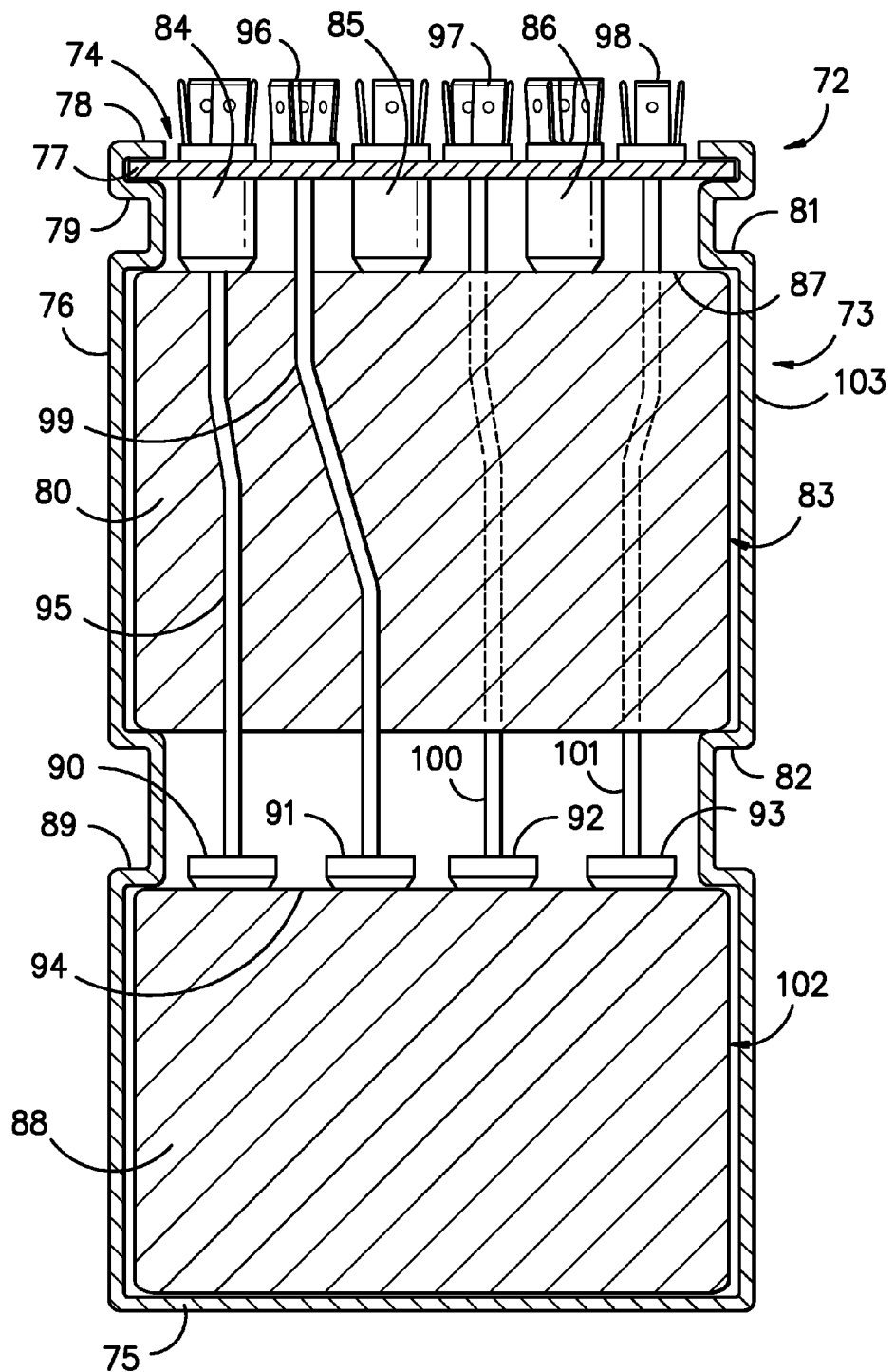
FIG. -9-

MULTI-RATED CAPACITOR ASSEMBLY

The present invention relates to an assembly of two or more capacitors in a compact case. Each of the capacitors contains two or more capacitor elements in a sealed housing, and each housing is provided with its own pressure interrupter. Each capacitor element is associated with an individual terminal and a common terminal, and it is possible to combine any or all of the capacitor elements in parallel. The capacitor assembly may be simultaneously connected to two electric circuits, each having a different capacitance requirement.

BACKGROUND OF THE INVENTION

The repair and service of electromechanical equipment often entails the replacement of a capacitor having a specific capacitance value. In view of the diversity of brands and product lines of electromechanical equipment, even within a particular industry such as HVAC, it is difficult for a service technician to stock a sufficiently broad range of capacitors to meet all replacement needs. Accordingly, it has been found to be useful to employ a single capacitor assembly that can be configured to provide a variety of capacitance values.

Industrial power factor correction capacitors having multiple capacitor units are known. Each of the units may contain multiple capacitors elements and a pressure interrupter to disconnect the flow of current should a failure occur. Power factor correction capacitors may be used with a 3-phase power supply to correct for the inductive load created by electric equipment.

Ward—U.S. Pat. No. 7,365,959 B1 discloses an assembly having multiple capacitor sectors or elements, which can be configured to achieve the desired capacitance by turning a dial switch mechanism, which is mounted on the cover.

Stockman—U.S. Pat. No. 8,531,815 B2 discloses a capacitor with multiple elements that can be connected to provide a variety of capacitance values by connecting terminals on the cover of the capacitor with jumper wires. A barrier cup assembly with fins extending between adjacent terminals on the cover is provided to prevent arcing. In one embodiment, four wound capacitor elements are oriented vertically and two wound capacitor elements are oriented horizontally in the head room above the vertically oriented capacitors. All of the capacitor elements are arranged within a single case, with a single pressure interrupter.

Despite the prior art developments in the field, there remains a need for a configurable, capacitor assembly that is easy to manufacture, employs multiple capacitor elements, conforms to the space limitations for replacement capacitors, and is readily configurable in the field, and meets all applicable safety requirements and UL test standards. Accordingly, a capacitor assembly is provided that meets the foregoing needs and objectives.

SUMMARY OF THE INVENTION

The capacitor assembly of the present invention has an outer case that holds two individual capacitors in vertical alignment within the case. Each of the capacitors contains two or more capacitor elements. For example, each capacitor may contain two, three, four or more capacitor elements. Each of the capacitors is sealed and is provided with its own pressure interrupter.

The case has a body with a top opening. The body has a bottom and a sleeve extending between the top opening and the bottom. The longitudinal extent of the sleeve is characterized by a central axis. The bottom of the case may be closed, or provided with an inward flange, that is, a flange projecting towards the central axis.

A terminal board overlays the top opening and is affixed to the case. The terminal board may be generally planar in shape and is sufficiently strong to mount two or more terminals thereon. In one embodiment of the invention, the terminal is an electrical insulator. The terminal board is provided with openings through which terminals mounted on the cover of the upper capacitor protrude.

The upper capacitor comprises a housing having a receptacle, with an opening at one end, and a cover overlaying the opening. The upper capacitor is positioned in the case, with the cover directly below and spaced apart from the terminal board. The upper capacitor contains a first capacitor element and a second capacitor element. Each of the capacitor elements is characterized by a first electrode and a second electrode separated by a dielectric, with a first lead electrically connected to the first electrode, and a second lead electrically connected to the second electrode.

A first terminal is mounted on the cover of the upper housing, electrically insulated from the cover, and electrically connected to the first lead of the first capacitor element. A second terminal is mounted on the cover of the upper housing, electrically insulated from the cover, and electrically connected to the first lead of the second capacitor element. A common terminal is mounted on the cover of the upper housing and electrically connected to the second leads of the first and second capacitor elements. The first, second and common terminals extend through openings in the terminal board and are accessible from outside of the case.

The capacitor assembly is provided with a lower capacitor, which is positioned in the case and oriented underneath the upper capacitor. For example, the upper and lower capacitors may be aligned coaxially. The lower capacitor comprises a housing having a receptacle, with an opening at one end, and a cover overlaying the opening. The lower capacitor contains a third capacitor element and a fourth capacitor element. Each of the capacitor elements is characterized by a first electrode and a second electrode separated by a dielectric, with a first lead electrically connected to the first electrode, and a second lead electrically connected to the second electrode.

A first contact is mounted on the cover of the lower housing, electrically insulated from the cover, and electrically connected to the first lead of the third capacitor element. A second contact is mounted on the cover of the lower housing, electrically insulated from the cover, and electrically connected to the first lead of the fourth capacitor element. A common contact is mounted on the cover of the lower housing, electrically insulated from the cover and electrically connected to the second leads of the third and fourth capacitor elements.

The common contact of the lower capacitor is electrically connected to the common terminal of the upper capacitor, with the electrical connection made exterior to the upper housing and the lower housing. For example, the electrical connection with the common contact may be made at a point on the common terminal between the terminal board and the cover of the upper housing. It can be understood that the second electrodes, that is, the common electrodes of the first, second, third and fourth capacitor elements are connected at the common terminal, which is accessible from outside of the case.

The first and second contacts on the cover of the lower capacitor, which are connected to the first electrodes of the third and fourth capacitor elements, respectively, are each electrically connected to a terminal mounted on the terminal board. Accordingly, the first contact is connected to a third terminal mounted on the terminal board, and the second contact is connected to a fourth terminal mounted on the terminal board. The resulting capacitor assembly has one common terminal connected to each of the capacitor elements and one individual terminal for each of the four capacitor elements.

It can be understood that the number of capacitor elements in the upper capacitor, the lower capacitor, or both can be increased by following the methodology set forth herein. If a capacitor is added to the upper capacitor, the first electrode is electrically connected to an additional terminal mounted on the cover of the upper housing, and the second electrode of the capacitor element is electrically connected to the existing common terminal. The additional terminal extends upward from the cover through the terminal board. If a capacitor element is added to the lower capacitor, the first electrode is electrically connected to an additional contact mounted on the cover of the lower housing, and the second electrode of the capacitor element is electrically connected to the common contact. The capacitor element added to the lower capacitor further requires an additional terminal mounted on the terminal board, and an electrical connection from the added contact to the added terminal.

The case of the capacitor assembly houses the upper capacitor and lower capacitor and supports the terminal board, while providing access to the common terminal and the individual terminals connected to each of the capacitor elements at a single location. In one embodiment of the invention, the terminal board has substantially the same circumference as the case sleeve. For example, the terminal board may be proportioned so that it does not extend beyond the case, in a direction perpendicular to the axis, and may be securely mounted within the circumference of the sleeve.

The case is provided with an upper compartment for the upper capacitor and a lower compartment for the lower capacitor. The upper capacitor and lower capacitor are held in the case with sufficient clearance to allow unimpeded movement of the pressure interrupter mechanism provided within each capacitor.

The case may have a unitary construction, such as a single, molded piece. By way of example, the sleeve of the case may be provided with an integral hinge, such as a living hinge, and one or more fasteners placed along the open edges of the sleeve, opposite the hinge. The fasteners may be corresponding snap-fit connections. In various embodiments of the invention, the case is made of a non-conductive polymer, for example, a thermoplastic polymer.

The upper capacitor engages the sleeve of the case in at least one location, whereby the upper capacitor is held in fixed relation relative to the terminal board, within the upper compartment. For example, an annular projection extending inward from the case sleeve may engage the upper capacitor and prevent the upper capacitor from sliding towards the terminal board.

The lower capacitor also engages the sleeve of the case in at least one location, whereby the lower capacitor is held in fixed relation relative to the upper capacitor, within the lower compartment. For example, an annular projection extending inward from the case sleeve may engage the lower capacitor, preventing the lower capacitor from sliding towards the upper capacitor.

The space to install the capacitor assembly in an electromechanical device is often limited. Accordingly, it is desirable that the outer dimensions of the capacitor assembly be streamlined. For example, the present invention may be practiced with a case having a cylindrical exterior, with the terminal board seated within the confines of the case.

The capacitor assembly of the present invention provides various advantages. The individual capacitors are easier to assemble, as compared to a single capacitor containing all of the capacitor elements, due to less internal connections. Safety requirements, such as UL, typically require that all electrical connections be severed upon capacitor failure. Fewer capacitor elements in a capacitor, means that fewer terminals connections need to be severed in a failure event. The failure of one capacitor will not impair the operation of the other capacitor. Consequently, (i) the capacitor assembly can be repaired by replacing the failed capacitor, (ii) the operable capacitor can be recycled, or (iii) the failed capacitor can be bypassed.

The modular nature of the capacitor assembly of the present invention provides various manufacturing advantages. For example, one capacitor may be provided with two to four capacitor elements having relatively low capacitance values, for example, 2.5 µF, 5 µF and 10 µF. The second capacitor may be selected from a capacitor having two capacitor elements with relatively high capacitance values, such as (i) 20 µF and 25 µF, or (ii) 30 µF and 15 µF. Thus, it is possible to serve a broader market, with greater flexibility and lower inventory expense. It is also within the scope of the invention to provide a case that can accommodate two capacitors selected from three, four or more capacitors, which vary from one another based upon the number of capacitor elements and the value of the capacitor elements. The housing of at least two the capacitors may be the same size, to allow interchangeability within a particular compartment of the case. The modular capacitor assembly may be field assembled, with the capacitors having desired values.

BRIEF DESCRIPTION OF THE DRAWINGS

FIG. 1 is a top perspective view of the capacitor assembly.

FIG. 2 is a top view of the capacitor assembly.

FIG. 3 is a top perspective view of the upper portion of the capacitor assembly showing jumper wires connecting the capacitor elements.

FIG. 4 is a side view of the capacitor assembly with the front of the case removed to show the interior.

FIG. 5 is a side view of the capacitor assembly with the back of the case removed to show the interior.

FIG. 6 is an exploded perspective view of the upper capacitor.

FIG. 7 is an exploded perspective view of the lower capacitor.

FIG. 8 is a side perspective view of the case, in an open position.

FIG. 9 is a side view of an alternative case design, with the case partially cut-away to show the arrangement of capacitors and electric connections within the case.

DETAILED DESCRIPTION OF THE INVENTION

Without intending to limit the scope of the invention, the preferred embodiments and features are hereinafter set forth. All of United States patents and published applications cited in the specification are incorporated herein by reference. The term "polymer" or "polymeric" as used in the present application denotes a material having a weight average molecular weight ($M_w$) of at least 5,000. Unless otherwise indicated, conditions are 25° C., 1 atmosphere of pressure, and 50% relative humidity. Unless otherwise indicated, the term "connection" is intended to refer to an electrical connection, which, for example, may be made by wire, tabs or foils, and where appropriate, the connection is electrically insulated. Unless otherwise indicated, the terms "insulated", "insulator" and "insulating" are intended to refer to electrical insulation. The terms "film" and "sheet" are used in their general sense to describe materials that are thin in comparison to their length and breadth.

The capacitor assembly of the present invention has at least two individual capacitors stacked vertically in a case. Each of the capacitors is separately sealed and may contain two, three, four or more capacitor elements. The capacitor elements are capable of supporting a direct current or alternating current potential, and thereby storing an electrical charge and energy.

The capacitor elements may be wound, film capacitors. The film capacitors may employ two metal foil electrodes separated by an insulating film, referred to generally as film/foil capacitors, or the electrodes may each comprise a thin metal layer deposited on a dielectric film or carrier film, generally referred to as metalized film capacitors, or be a combination thereof. The capacitor elements may each be individually wound around a separate axis, or the capacitor elements may be co-wound around a common axis, with each element being represented by a sector, as is known on the art. The capacitors may contain an insulating fluid, gel or resin, such as oil, polyurethane gel or epoxy resin.

In one embodiment of the invention, the capacitor element is constructed from two polymer films, each having a metal applied to the surface of one side of the film, for example, by vapor deposition, with the opposite side of the film remaining uncoated to function as the dielectric. Suitable metals include zinc, aluminum, or an alloy of zinc and aluminum. The polymer film may be a thermoplastic, thermosetting or elastomeric polymer. Specific examples include polyolefins, especially polyethylene, polypropylene and ethylene/propylene copolymers, and polyesters, especially polyethylene terephthalate (PET) and polyethylene naphthalate (PEN). By way of example, the polymer substrate may be 0.3 μm to 30 μm thick, preferably 1.0 μm to 8 μm thick, and the width of the polymer substrate may be from 20 mm to 200 mm.

If a separate dielectric sheet is employed, the sheet may be selected from any insulating material, including polymers, such as polypropylene, polyester, polyethylene, polyamide, polyimide, etc. In one embodiment of the invention, there may be more than two dielectric sheets. For example, a third conductive sheet may be added, whose primary purpose is to provide a metallized surface which connects the first two sheets in series electrically.

The conductive sheets are wound together, with a sheet of a separate dielectric material inserted in between, if necessary. The sheets may be wound around a core, which may be cylindrical, rectangular or other shape selected to create a capacitor element with the desired cross-sectional aspect ratio. The core may be collapsible, allowing the capacitor element to be flattened. Alternatively, the capacitor element may be a coreless winding, which may be selected to create a capacitor element with a more flattened cross-section. By way of example, a capacitor element formed by winding together two conductive sheets, each having a metalized surface with the conductive sheets separated by a dielectric, may comprise from 100 to 10,000 plates, as calculated along a radius perpendicular to the center of the winding.

The capacitor elements are provided with a common edge for each of the conductive sheets, at opposite ends of the capacitor element. By way of example, the common edge may be created by offsetting or staggering the conductive sheets, relative to each other. Alternatively, the common edges at opposite ends of the capacitor element may be created by providing a non-conductive edge at the top of one conductive sheet and a non-conductive edge at the bottom of the other conductive sheet.

A metal coating may be applied to each common edges of the capacitor element, for example, by thermal spraying, thereby providing first and second end termination sites, to electrically connect each end of the capacitor element to a terminal mounted on the cover of the housing. The electrical connections to the termination ends may be tabs, which can be welded to the common edges, for example, to form a metallurgical bond. Suitable capacitor elements and their construction may be found in U.S. Pat. No. 8,098,479 B1.

The present invention is particularly suited to employ capacitor elements that are single capacitors, thereby taking advantage of the reliability, the economies of manufacture and the ability to provide robust electrical connections among the capacitors and between the capacitors and terminals, associated with single capacitors. One or more of the capacitor elements may, however, be a multi-sector capacitor, which are known to those skilled in art and disclosed, for example, in U.S. Pat. No. 8,531,815 B2.

Referring to FIG. 1, capacitor assembly 1 has case 2, with top opening 3, bottom 4 and sleeve 5. Flange 6 is directed inward and partially overlays terminal board 7, which covers top opening 3 of case 2. Six terminals are accessible on terminal board 7 for connecting the capacitor assembly to one or more electric circuits.

Case 2 is illustrated as being cylindrical, but may be a rectangular prism or other three-dimensional geometry, or combinations thereof. For example, the case may be in the shape of a rectangular prism, having a rectangular bottom and a rectangular cross-section with planar sides along the sleeve, which transitions to a circular top opening and terminal board.

Referring to FIGS. 1 and 2, terminals 8, 9 and 10 are mounted on the cover of the upper capacitor and extend through openings 11, 12 and 13, respectively, in terminal board 7. Terminals 9 and 10 are electrically connected to the first electrodes associated with each of two capacitor elements positioned in the upper capacitor. Terminal 8 is the common terminal, which is electrically connected to the second electrode of each of the capacitor elements comprising the capacitor assembly, as well as electrically connected to the second electrode of each of the capacitor elements in the lower capacitor. Terminals 14, 15 and 16 are mounted on terminal board 7, and electrically connected to the first electrodes of each of the three capacitor elements in the lower capacitor. Terminal board 7 may be constructed of a material that is an electrical insulator, such as nylon 6/6 or a phenolic resin, thereby obviating the need to provide additional insulation between the terminals and the terminal board.

Each of the terminals may have two, three or four individual blades extending from the terminal board. Jumper wires can be connected to the blades of the terminals, to allow configuration of the capacitor assembly to achieve a desired capacitance value. For example, it is possible to (i) connect any or all of the capacitor elements in parallel in an electric circuit; (ii) connect some of the capacitor elements in one electric circuit and connect some of the capacitor element in another electric circuit, each circuit having a different capacitance requirement. The electric circuit may contain an AC or DC motor.

The total number of terminals extending from the terminal board includes one terminal for each of the capacitor elements in the upper capacitor and one common terminal, which are mounted on the cover the upper capacitor, and one terminal for each of the capacitor elements in the lower capacitor, which are mounted on the terminal board. For example, the capacitor assembly may have five, six or seven terminals accessible on the terminal board, which represents four, five and six capacitor elements, respectively. In one embodiment of the invention, the center-to-center spacing between terminals is 20.5 mm or greater.

The terminals may be provided with insulator cups, as is known in the art. In one embodiment of the invention, the insulator cups or other insulator employed with any of the terminals or contacts are color coded to identify the capacitance value of the individual capacitor element, with which they are associated, or to identify the common terminal or contact. Alternatively, a numbering system may be employed with the terminals or contacts, to identify the individual capacitor elements or common terminal or contact.

In one embodiment of the invention, the capacitor assembly is connected to an electric circuit, with one of the capacitor elements from the upper capacitor and one of the capacitor elements from the lower capacitor in the circuit. For example, the one capacitor element from the upper capacitor and the one capacitor from the lower capacitor may have different capacitance values and be combined in parallel to provide a desired capacitance value. Referring to FIGS. 1-3, each of terminals 8, 9, 10, 14, 15 and 16 has three blades 17a, 17b and 17c. Jumper wire 18 is connected at one end to common terminal 8 and the opposite end of jumper wire 18 is connected to an electric circuit. Jumper wire 19 connects terminal 9 of a capacitor element of the upper capacitor with terminal 14 of a capacitor element of the lower capacitor, in parallel. Jumper wire 20 is connected at one end to terminal 9 and the opposite end of jumper wire 20 is connected to an electric circuit.

Referring to FIGS. 4 and 5, front and back side views of capacitor assembly 1 are shown, with a section of sleeve 5 of case 2 removed, to reveal the internal arrangement. Upper capacitor 21 is positioned in upper compartment 22 of case 2. Upper capacitor 21 has housing 23, having receptacle 24 and cover 25. Terminal 8 (common), terminal 9 and terminal 10 are mounted on cover 25 and electrically insulated from the cover. It can be seen that terminals 8, 9 and 10 are provided with bases 26, 27 and 28, respectively, which bridge the distance between cover 25 and terminal board 7, to extend the blades above terminal board 7, thereby allowing access.

Case 2 has annular projection 29, which extends inward toward axis A, at the center of case 2. Annular projection 29 engages upper capacitor 21 and prevents longitudinal movement of upper capacitor 21, relative to sleeve 5. The distance B between the underside of terminal board 7 and cover 25 is sufficient to allow upper capacitor 21 to expand in a longitudinal (axial) direction under pressure, thereby interrupting the electrical connections within the capacitor. For example, distance B may be ¼ inch or greater. Should a failure cause the cover of upper capacitor 21 to deform outward, the terminals are free to move relative to terminal board 7 and in a direction perpendicular thereto.

Additionally, terminals 8, 9 and 10 should extend across distance B and through the holes in terminal board 7, so that the blades of the terminals are accessible from the exterior of the case. For example, distance B may range from ¼ inch to ¾ inch.

Referring to FIG. 8, annular projection 29 may be provided with a recess, such as slot 30, created by two parallel rings 29a and 29b. Cover 25 of upper capacitor 21 may be provided with lip 31, which engages slot 30 of annular projection 29, thereby preventing movement of upper capacitor 21 both towards and away from terminal board 7. Additionally, upper compartment 22 of case 2 may include shelf 32 extending from sleeve 5 into the interior of case 2, for supporting upper capacitor 21. Flexible rib 33 extends inward from sleeve 5 and is positioned between annular projection 29 and shelf 32. Rib 33 is compressed against receptacle 24 of upper capacitor 21, to provide additional stability to the assembly.

Referring to FIG. 6, an exploded view of upper capacitor 21 shows capacitor element 34 and capacitor element 35, formed by the interior and exterior windings, respectively, of concentrically wound film capacitors. Lead 36 connects a first electrode of capacitor element 34 with terminal 10. Lead 37 connects a first electrode of capacitor element 35 with terminal 9. Common lead 38 connects the second electrodes of each of capacitor elements 34 and 35 with terminal 8, the common terminal.

Lower capacitor 39 is positioned in lower compartment 40 of case 2. Lower capacitor 39 has housing 41, with receptacle 42 and cover 43. Contacts 44, 45, 46 and 47 are mounted on cover 43 and electrically insulated from the cover. The contacts may be low profile electrical connectors. The contacts need not be accessible from outside the case.

Referring to FIG. 7, an exploded view of lower capacitor 39 shows capacitor elements 48, 49 and 50. Capacitor elements 48-50 are individually wound film capacitors. The capacitor elements may be elliptical in cross-section to better utilize the space within housing 41. Lead 51 connects a first electrode of capacitor element 48 and contact 44. Lead 52 connects a first electrode of capacitor element 49 and contact 45. Lead 53 connects a first electrode of capacitor element 50 and contact 46. And, lead 54 connects a second electrode of each of capacitor elements 48-50 with contact 47, the common contact for lower capacitor 21.

Electrical connection 55 is provided between common contact 47 of lower capacitor 39 and common terminal 8 of upper capacitor 21. Connection 55 is positioned on the exterior of the upper and lower capacitors. It may be positioned inside case 2 and connect to terminal 8 between cover 25 and terminal board 7. Each of contacts 44, 45 and 46 is electrically connected to the underside of one of the terminals mounted on terminal board 7. Accordingly, contact 44 is connected to terminal 14 by connection 56. Contact 45 is connected to terminal 15 by connection 57. And, contact 46 is connected to terminal 16 by connection 58. The electrical connections are positioned within case 2.

The requirements for the annular projections and shelves that support the upper and lower capacitor is that they make sufficient contact to support the respective capacitors within the case, thereby preventing relative movement between the capacitor and case. Accordingly, the annular projection and shelves may engage the capacitor housings in discrete locations, that is, they may be discontinuous and need not form a continuous ring projecting inward from the circumference of sleeve 5 of case 2. With respect to annular projection 39 and shelf 32, in particular, it is advantageous to provide one or more gaps, such as a groove or furrow, to serve as a chase for the electric connections from the contacts on the cover of the lower capacitor to the common terminal of the upper capacitor and the terminals mounted on the terminal board.

The housing for the upper capacitor and lower capacitor is made from a material that is substantially impermeable to gases. By way of example, the housing may be made out of metal, in particular, steels including cold-rolled steel, mild steel, stainless steel, and other alloys, copper, tantalum, aluminum, titanium, niobium, nickel, iron, and zinc. If the housing material is susceptible to corrosion, either internally or externally, the material may be coated, plated or provided with other protective treatment, as is known to those skilled in the art. Alternatively, the housing may be made from a synthetic polymeric material, such as thermoplastic resins, thermoplastic elastomers or thermosetting resins.

Case 2 has annular projection 59, which extends inward toward axis A, at the center of case 2. Annular projection 59 engages lower capacitor 39 and prevents longitudinal movement of lower capacitor 39, relative to sleeve 5. The distance C between the underside of upper capacitor 21 and contacts 44-47 is sufficient to allow lower capacitor 39 to expand in a longitudinal (axial) direction under pressure, thereby interrupting the electrical connections within the lower capacitor. For example, distance C may be ¼ inch or greater. In one embodiment of the invention, distance C is from ½ inch to 1½ inches.

Referring to FIG. 8, annular projection 59 may be provided with a recess, such as slot 60, created by two parallel rings 59a and 59b. Cover 43 of lower capacitor 39 may be provided with lip 61, which engages slot 60 of annular projection 59, thereby preventing movement of lower capacitor 39 both towards and away from upper capacitor 21. Additionally, lower capacitor 39 may be supported on its underside by resting on bottom 4 of case 2. Flexible rib 62 extends inward from sleeve 5 and is positioned between annular projection 59 and bottom 4 of case 2. Rib 62 is compressed against receptacle 42 of lower capacitor 39, to provide additional stability to the assembly.

Referring to FIGS. 4, 5 and 8, terminal board 7 is supported on its upper side by flange 6 of case 2 and on its lower side by shelf 63, which is an annular projection from sleeve 5 oriented perpendicular to axis A of case 2. The distance between flange 6 and shelf 63 is approximately equal to the thickness of terminal board 7, thereby locking terminal board 7 in place, within case 2.

Case 2 may have a clamshell configuration, as shown in FIG. 8. Case 2 is provided with living hinge 64, separating the case into two, joined sections. The closure system for case 2 may be integrally-molded, snap-fit closures, such as corresponding male/female components. For example, case 2 may be provided with male components 65 and 66 along one edge of case 2, and female components 67 and 68 along an opposite edge of case 2. Alternatively, case 2 may be secured by buckles, elastic bands or strips, zip ties, flexible jackets, or the like.

In one embodiment of the invention, case 2 is capable of being injection molded, as a single part. The material of construction may be a thermoplastic polymer, for example, polypropylene or a modified polyphenylene ether (PPE), such as Noryl®. An advantage of the present invention is that case 2 can be made of an electric insulator, whereas the housing of the upper capacitor and lower capacitor may be made of metal—the capacitor assembly will be protected, while the individual capacitors will benefit from the strength of the metal housing. Additionally, it has been found that it is not necessary to ground the capacitor assembly, when the case is non-conductive.

Case 2 may be provided with viewing port 71 in the side of case 2, slightly above cover 43 of lower capacitor 39, to allow inspection of the cover in case of a suspected failure of the capacitor.

Referring to FIGS. 6 and 7, both upper capacitor 21 and lower capacitor 39 are provided with pressure interrupters. Upper capacitor 21 is provided with pressure interrupter assembly 69. Lower capacitor 39 is provided with pressure interrupter assembly 70. Pressure within the housing causes the housing to expand and break the electrical connection between the terminals or contacts mounted on the cover of the capacitor. In one embodiment of the invention, the cover of each of the housings will deform outward under pressure to separate the cover from a rigid plate, to break the connection between the terminals or contacts and the leads connected to the capacitor elements. Examples of suitable pressure interrupters are disclosed in U.S. Pat. Nos. 4,106,068 and 4,398,782.

In one embodiment illustrated, cover 43 of lower capacitor 39 is oriented opposite the receptacle 24 of upper housing 21. Alternatively, lower capacitor 39 may face in an opposite direction, that is, cover 43 facing toward bottom 4 of case 2. It can be understood that sufficient space for capacitor 39 to expand in a longitudinal (axial) direction relative to case 2 should be provided, such as leaving space between the contacts on the cover and the bottom of the case, or by providing a case with an open bottom.

An alternative case design is disclosed in FIG. 9. Capacitor assembly 72 has case 73 with top opening 74, bottom 75 and sleeve 76. Terminal board 77 is affixed in place by flange 78 and shelf 79 of case 73. Case 73 may be injection molded to create a clamshell structure with a living hinge, having similar materials of construction and insulating properties as case 2, shown in FIG. 8.

Upper capacitor 80 is secured within case 73 by annular projection 81 and shelf 82, which define upper compartment 83 of case 73. Terminal 84, the common terminal, terminal 85 and terminal 86 extend from cover 87 of upper capacitor 83 through openings in terminal board 77.

Lower capacitor 88 is secured within case 73 by annular projection 89 and bottom 75 of case 73, which define lower compartment 102. Lower capacitor 88 has contacts 90, the common contact, and contacts 91-93 mounted on cover 94 of lower capacitor 88. Common contact 90 is electrically connected to common terminal 84 by connector 95. Contacts 91, 92 and 93 are electrically connected to terminals 96, 97 and 98, mounted on terminal board 77, by connectors 99, 100 and 101, respectively.

The annular projections and shelves extend inward from the circumference 103 of sleeve 76, taking the circumference of the portion of sleeve 76 around the perimeter of upper capacitor 80 and lower capacitor 88, as a reference.

Upper capacitor 80 and lower capacitor 88 may each optionally be provided with pressure interrupters, as is known in the art and described herein with regard to the embodiment of the invention illustrated in FIGS. 6 and 7. Furthermore, case 73 provides sufficient space between the upper capacitor cover 87 and terminal board 77, to allow upper capacitor 80 to expand longitudinally under pressure, thereby interrupting the electrical connections within the capacitor. Likewise, case 73 provides sufficient space between the lower capacitor 88 and any obstruction, such as cover 94 and the bottom of upper capacitor 80, to allow lower capacitor 88 to expand longitudinally under pressure, thereby interrupting the electrical connections within the capacitor. By way of example, the space between the upper capacitor cover 87 and terminal board 77 and the space between the lower capacitor cover 94 and the bottom of upper capacitor 80 may correspond to distances B and C, respectively, as described in detail with regard to the embodiment of the invention illustrated in FIGS. 4, 5 and 8.

The methodology herein may be used to provide a capacitor assembly with three, four or more individual capacitors, in axial alignment within a case, each capacitor comprising two or more capacitor elements, with terminals accessible from a single terminal board affixed to the top of the case.

The capacitor assembly of the present invention is particularly useful for HVAC units, which typically require a motor run capacitor for both the compressor and the fan. The capacitor assembly may also be used in an electric circuit as a motor start capacitor. By way of example, the capacitor assembly may include a total of from four to six capacitor elements ranging in capacitance values of from 0.5 µF to 50 µF. In one embodiment of the invention, the capacitor assembly comprises at least four capacitor elements, wherein each of the four capacitor elements has a capacitance value that varies by 5 µF or more relative to the other three capacitor elements.

There are, of course, many modifications and alternative embodiments of the invention that are intended to be included within the scope of the following claims.

What we claim is:

1. A capacitor assembly, comprising:
   (a) a case having a body with an opening at one end;
   (b) a terminal board overlaying the opening in the body and affixed to the case;
   (c) an upper capacitor comprising (i) an upper housing having a receptacle with an opening at one end and a cover overlaying the opening, wherein the upper housing is positioned within the case and oriented with the terminal board of the case overlaying the cover of the upper housing; (ii) first and second capacitor elements positioned in the upper housing, wherein each of the capacitor elements comprises a first electrode and a second electrode separated by a dielectric, a first lead connected to the first electrode and a second lead connected to the second electrode; (iii) a first terminal connected to the first lead of the first capacitor, mounted on the cover, and electrically insulated from the cover, whereby the first terminal extends through the terminal board; (iv) a second terminal connected to the first lead of the second capacitor, mounted on the cover, and electrically insulated from the cover, whereby the second terminal extends through the terminal board; and (v) a common terminal connected to the second lead of the first capacitor and the second lead of the second capacitor, mounted on the cover, and electrically insulated from the cover, whereby the common terminal extends through the terminal board; and (vi) a pressure interrupter incorporated in the upper housing, whereby pressure built up within the upper housing causes the upper housing to expand and break the connection between the common terminal and the first and second capacitors;
   (d) a lower capacitor comprising (i) a lower housing having a receptacle with an opening at one end and a cover overlaying the opening, wherein the lower housing is positioned within the case and oriented underneath the upper capacitor; (ii) third and fourth capacitor elements positioned in the lower housing, wherein each of the capacitor elements comprises a first electrode and a second electrode separated by a dielectric, a first lead connected to the first electrode and a second lead connected to the second electrode; (iii) a first contact connected to the first lead of the third capacitor, mounted on the cover, and electrically insulated from the cover; (iv) a second contact connected to the first lead of the fourth capacitor, mounted on the cover, and electrically insulated from the cover; and (v) a common contact connected to the second lead of the third capacitor and the second lead of the fourth capacitor, mounted on the cover, and electrically insulated from the cover; and (vi) a pressure interrupter incorporated in the lower housing, whereby pressure built up within the lower housing causes the lower housing to expand and break the connection between the common contact and the third and fourth capacitors;
   (e) an electrical connection between the common terminal and the common contact, wherein the electrical connection is positioned exterior to the upper housing and lower housing;
   (f) a third terminal mounted on the terminal board and extending therefrom and electrically connected to the first contact of the lower housing; and
   (g) a fourth terminal mounted on the terminal board and extending therefrom and electrically connected to the second contact of the lower housing.

2. The capacitor assembly of claim 1, wherein the upper housing cover and the first, second and common terminals are free to move relative to the terminal board, and the pressure interrupter incorporated in the upper housing comprises a rigid plate and the cover of the upper housing is deformable, whereby internal pressure causes the cover to expand away from the rigid plate, thereby disconnecting the common terminal from the first and second capacitor elements.

3. The capacitor assembly of claim 2, whereby the terminal board is separated from the cover of the upper housing by a distance of ¼ inch or greater.

4. The capacitor assembly of claim 2, wherein the terminal board is separated from the cover of the upper housing by a distance of from ¼ inch to ¾ inch.

5. The capacitor assembly of claim 1, wherein the pressure interrupter incorporated in the lower housing comprises a rigid plate and the cover of the lower housing is deformable, whereby internal pressure causes the cover to expand away from the rigid plate, thereby disconnecting the common contact from the third and fourth capacitor elements.

6. The capacitor assembly of claim 5, wherein the cover of the lower housing faces toward the upper capacitor, and the first contact, second contact and common contact mounted on the cover of the lower housing are separated from the upper capacitor by a distance of from ½ inch to 1½ inches.

7. The capacitor assembly of claim 1, wherein the capacitor assembly further comprises a jumper wire electrically connecting the first or second terminal with the third or fourth terminal.

8. The capacitor assembly of claim 1, wherein the first, second, third, and fourth capacitor elements each have a capacitance value ranging from 0.5 to 50 µF.

9. The capacitor assembly of claim 1, wherein the first, second, third and fourth terminals each have two blades extending therefrom, and the terminals of the capacitor assembly may be simultaneously connected to provide two different capacitance values to two different motors.

10. The capacitor assembly of claim 1, further comprising (i) a fifth capacitor element positioned in the lower housing and having a first electrode and a second electrode separated by a dielectric, a first lead connected to the first electrode and a second lead connected to the second electrode and the common contact; (ii) a third contact connected to the first lead of the fifth capacitor, mounted on the cover of the lower housing, and electrically insulated from the cover; and (iii) a fifth terminal mounted on the terminal board and extending therefrom and electrically connected to the third contact of the lower housing.

11. A capacitor assembly, comprising:
   (a) a case having a top opening, a bottom, and a sleeve extending between the top opening and the bottom, the sleeve defining a central axis;
   (b) a terminal board overlaying the top opening and affixed to the sleeve;
   (c) an upper capacitor comprising (i) an upper housing having a receptacle with an opening at one end and a cover overlaying the opening, wherein the upper housing is positioned within the case and oriented with the terminal board of the case overlaying the cover of the upper housing; (ii) first and second capacitor elements positioned in the upper housing, wherein each of the capacitor elements comprises a first electrode and a second electrode separated by a dielectric, a first lead connected to the first electrode and a second lead connected to the second electrode; (iii) a first terminal connected to the first lead of the first capacitor, mounted on the cover, and electrically insulated from the cover, whereby the first terminal extends through the terminal board; (iv) a second terminal connected to the first lead of the second capacitor, mounted on the cover, and electrically insulated from the cover, whereby the second terminal extends through the terminal board; and (v) a common terminal connected to the second lead of the first capacitor and the second lead of the second capacitor, mounted on the cover, and electrically insulated from the cover, whereby the common terminal extends through the terminal board; and (vi) a pressure interrupter incorporated in the upper housing, whereby pressure built up within the upper housing causes the upper housing to expand and break the connection between the common terminal and the first and second capacitors;
   (d) the case further having a first annular projection extending inwardly from a circumference of the sleeve, the first annular projection engaging the upper housing to restrict movement of the upper housing relative to the case along the axis;
   (e) a lower capacitor comprising (i) a lower housing having a receptacle with an opening at one end and a cover overlaying the opening, wherein the lower housing is positioned within the case and oriented underneath the upper capacitor along the axis of the case; (ii) third and fourth capacitor elements positioned in the lower housing, wherein each of the capacitor elements comprises a first electrode and a second electrode separated by a dielectric, a first lead connected to the first electrode and a second lead connected to the second electrode; (iii) a first contact connected to the first lead of the third capacitor, mounted on the cover, and electrically insulated from the cover; (iv) a second contact connected to the first lead of the fourth capacitor, mounted on the cover, and electrically insulated from the cover; and (v) a common contact connected to the second lead of the third capacitor and the second lead of the fourth capacitor, mounted on the cover, and electrically insulated from the cover; and (vi) a pressure interrupter incorporated in the lower housing, whereby pressure built up within the lower housing causes the lower housing to expand and break the connection between the common contact and the third and fourth capacitors;
   (f) an electrical connection between the common terminal and the common contact, wherein the electrical connection is positioned exterior to the upper housing and lower housing;
   (g) a third terminal mounted on the terminal board and extending therefrom and electrically connected to the first contact of the lower housing;
   (h) a fourth terminal mounted on the terminal board and extending therefrom and electrically connected to the second contact of the lower housing; and
   (i) a second annular projection extending inwardly from the circumference of the sleeve, the second annular projection engaging the lower housing to restrict movement of the lower housing relative to the case along the axis.

12. The capacitor assembly of claim 11, wherein the bottom of the case is closed.

13. The capacitor assembly of claim 11, wherein the first, second, third and fourth terminals each have two blades extending therefrom, and the terminals of the capacitor assembly may be simultaneously connected to provide two different capacitance values to two different motors.

14. The capacitor assembly of claim 11, wherein the case is a molded, non-conductive thermoplastic polymer.

15. The capacitor assembly of claim 14, wherein the case has a unitary, clamshell configuration.

16. The capacitor assembly of claim 11, wherein the terminal board is affixed to the case, within a circumference of the sleeve of the case.

17. The capacitor assembly of claim 11, wherein the upper housing comprises a lip adjacent the cover, and the first annular projection of the case engages the lip of the upper housing.

18. The capacitor assembly of claim 17, whereby the terminal board is separated from the cover of the upper housing by a distance of ¼ inch or greater.

19. The capacitor assembly of claim 18, wherein the pressure interrupter incorporated in the lower housing comprises a rigid plate and the cover of the lower housing is deformable, whereby internal pressure causes the cover to expand away from the rigid plate, thereby disconnecting the common contact from the third and fourth capacitor elements, and wherein the cover of the lower housing faces toward the upper capacitor, and the first contact, second contact and common contact mounted on the cover of the lower housing are separated from the upper capacitor by a distance of from ½ inch to 1½ inches.

20. The capacitor assembly of claim 17, wherein the terminal board is separated from the cover of the upper housing by a distance of from ¼ inch to ¾ inch.

* * * * *